Jan. 12, 1960
D. O. BENSON
2,920,436
ROTARY SAFETY BLADE
Filed May 31, 1956
2 Sheets-Sheet 1
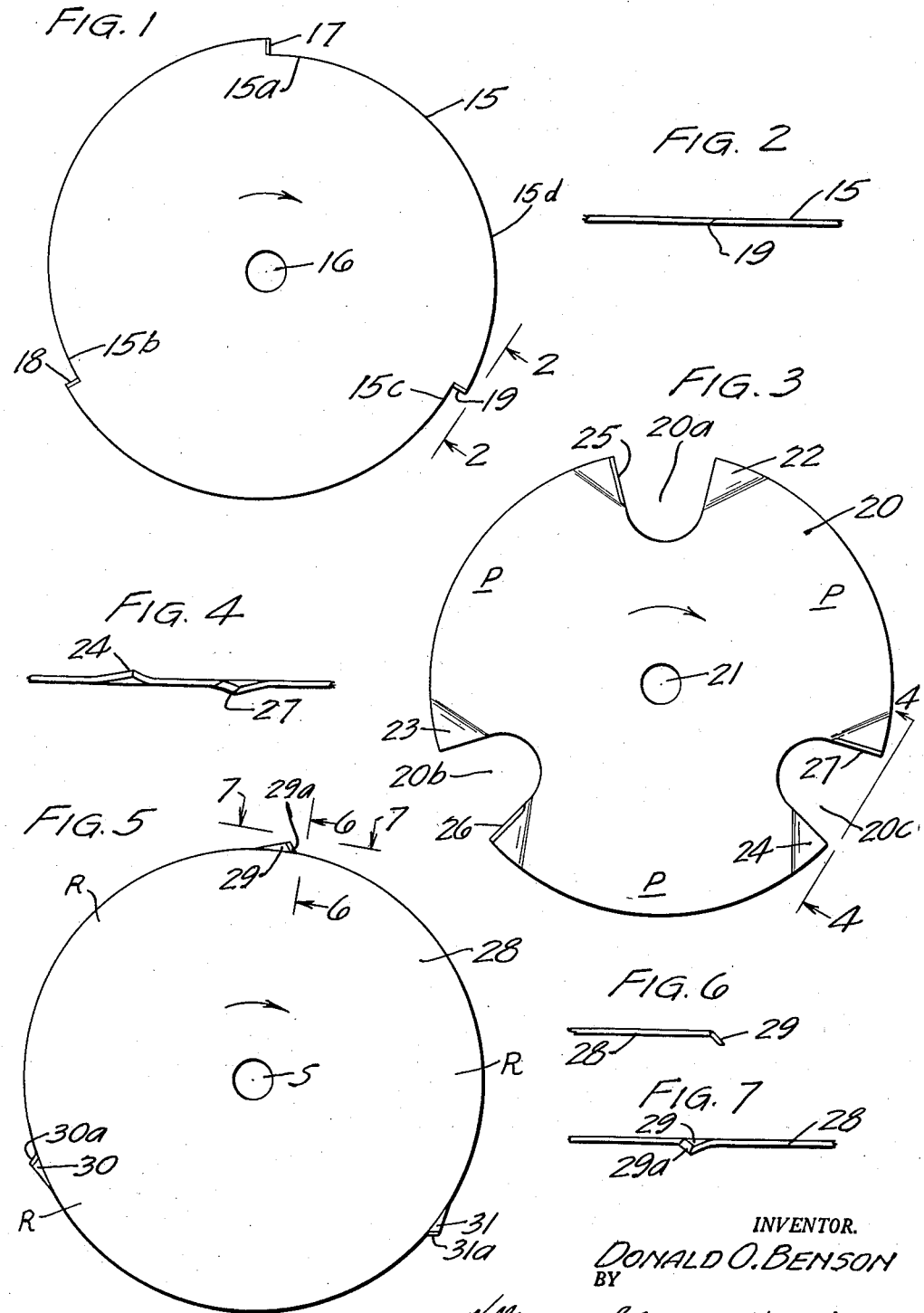
INVENTOR.
DONALD O. BENSON
BY
Williamson, Schroeder, Adams & Meyers
ATTORNEYS Jan. 12, 1960
D. O. BENSON
2,920,436
ROTARY SAFETY BLADE
Filed May 31, 1956
2 Sheets-Sheet 2
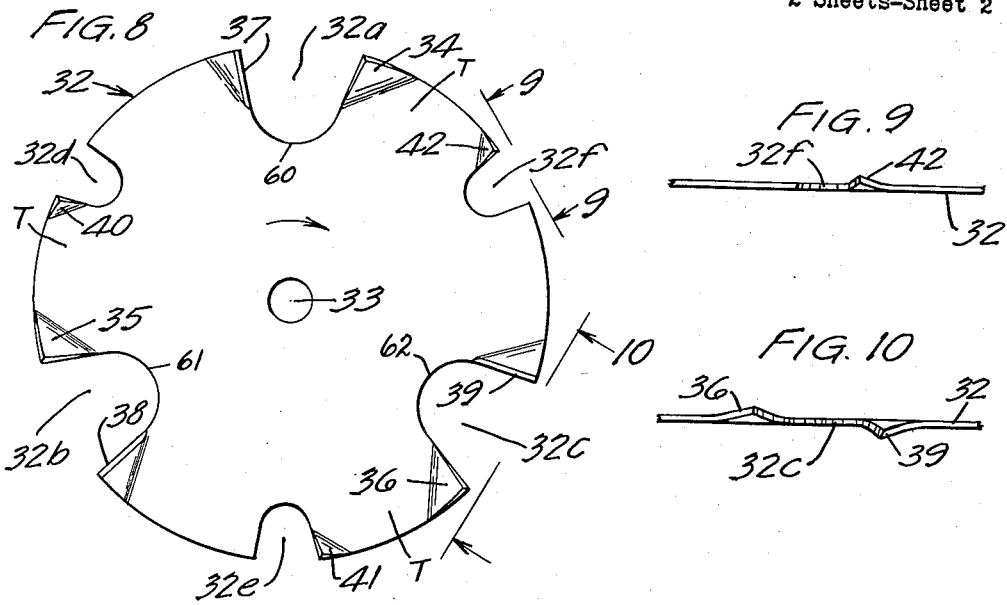
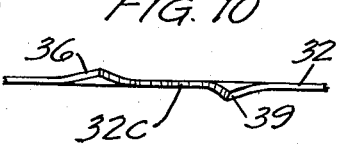
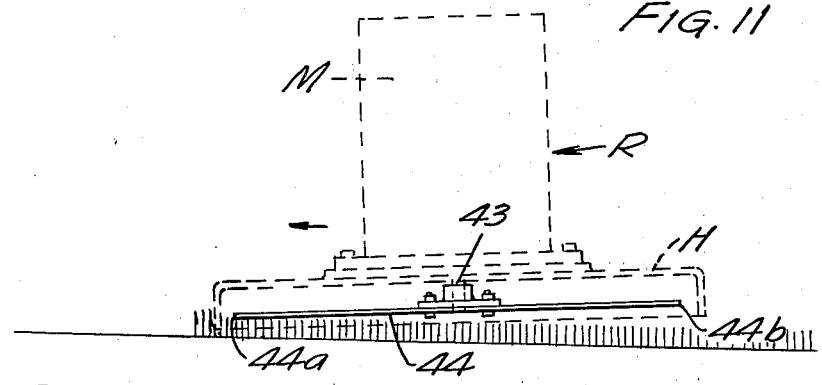
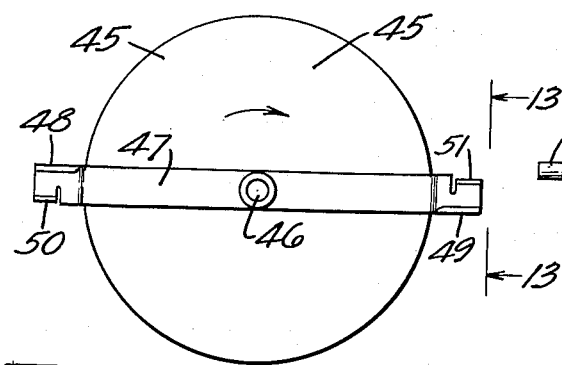
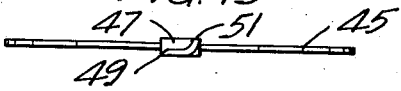
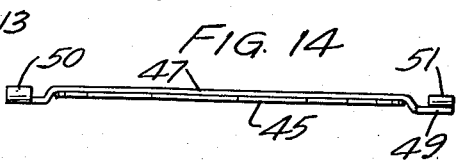
INVENTOR.
DONALD O. BENSON
BY
Williamson, Schroeder, Adams & Meyers
ATTORNEYS

United States Patent Office

2,920,436
Patented Jan. 12, 1960

2,920,436

ROTARY SAFETY BLADE

Donald O. Benson, Minneapolis, Minn., assignor to Toro Manufacturing Corporation, Minneapolis, Minn., a corporation of Minnesota Application May 31, 1956, Serial No. 588,505

4 Claims. (Cl. 56—295)

This invention relates to grass mowing machines. More particularly it relates to blades for rotary grass mowing machines of the type utilizing a blade revolving in a horizontal plane about a vertical shaft.

Experience has shown that serious injury can result to either observers or operators of rotary mowers when the blade of such a mower travelling at high speed engages a foreign object and imparts a dangerous trajectory and speed to it. A secondary danger can occur from pieces of a conventional blade being fractured by engaging an object of appreciable mass and thence being projected in a dangerous trajectory. This danger is inherent in rotary mower blades as heretofore known because of their design and configuration. My blades, as herein disclosed, are designed so that the blade cannot impart dangerous trajectories to any particles of appreciable mass which they may engage.

It is a general object of my invention to provide a novel and improved rotary mower blade so designed as to substantially increase the degree of safety with which it may be utilized.

A more specific object is to provide a novel and improved rotary mower blade designed to substantially eliminate the danger normally associated therewith and resulting from particles of appreciable mass to which a dangerous trajectory and speed have been imparted by the blade.

Another object is to provide a novel and improved rotary mower blade constructed and arranged so as to make it virtually impossible for the blade to impart a dangerous speed and trajectory to an object having appreciable mass.

Another object is to provide a novel and improved rotary mower blade constructed and arranged so as to substantially reduce the amount of power required to drive the same in addition to substantially increasing the degree of safety with which they may be utilized.

Another object is to provide a novel and improved rotary mower blade constructed and arranged so as to reduce to a minimum the probability of the blades being fractured and a piece thereof being thrown outwardly at a dangerous trajectory and speed.

Another object is to provide a novel and improved rotary mower blade so constructed and oriented during rotation so as to substantially increase its safety features and increase the effectiveness of its cutting operation.

Another object is to provide a novel and improved rotary mower blade so constructed as to substantially reduce the noise level created during its rotation.

Another object is to provide a novel and improved rotary mower blade so constructed as to reduce vibrations during acceleration and operation thereof and thus increase the span of life and service of the engine which drives the blades.

Another object is to provide a novel and improved rotary mower blade so constructed as to make it impossible to engage objects of considerable mass near their centroids and thus preclude sudden impact of appreciable moment and consequent shock effect on the entire machine.

These and other objects and advantages of my invention will more fully appear from the following description made in connection with the accompanying drawings, wherein like reference characters refer to the same or similar parts throughout the several views, and in which:

Fig. 1 is a plan view of one embodiment of my invention.

Fig. 2 is an edge elevational view taken along line 2—2 of Fig. 1.

Fig. 3 is a plan view of second embodiment of my invention.

Fig. 4 is an edge elevational view taken along line 4—4 of Fig. 3.

Fig. 5 is a plan view of a third embodiment of my invention.

Fig. 6 is a sectional view taken along line 6—6 of Fig. 5.

Fig. 7 is an edge elevational view taken along line 7—7 of Fig. 5.

Fig. 8 is a plan view of a fourth embodiment of my invention.

Fig. 9 is an edge elevational view taken along line 9—9 of Fig. 8.

Fig. 10 is an edge elevational view taken along line 10—10 of Fig. 8.

Fig. 11 is a side elevational view of a rotary type mower with the axis of rotation of the vertical shaft tilted slightly forwardly in the direction of movement of the mowing machine.

Fig. 12 is a plan view of a fifth embodiment of my invention.

Fig. 13 is an edge elevational view taken along line 13—13 of Fig. 12.

Fig. 14 is an edge elevational view taken along line 14—14 of Fig. 12.

Fig. 1 shows one embodiment of my invention which may include a substantially circular disc 15 which is formed of a flat plate-like material as best shown in Fig. 2. This disc 15 is adapted to be mounted upon the lower end portion of a vertical shaft 16 so as to rotate at a slight distance above the ground in position to cut the grass as the vehicle which carries the shaft 16 is moved forwardly. The disc 15 is rotated by the shaft 16 in the direction of the arrow shown in Fig. 1. It will be noted that the disc 15 is continuous from the shaft 16 outwardly to its peripheral portions and that its outer surface 15d is not truly circular in configuration. It will be noted that the peripheral portions of the disc 15 are gradually cut away to provide blade elements 17, 18 and 19. Each of these blade elements extends outwardly beyond the peripheral portions of the disc 15 which immediately precede the blade as at 15a, 15b and 15c. In using the term "peripheral portions" I am referring to those portions of the blade 15 immediately adjacent to and defining its outer edge surface 15d and wherever hereinafter that term is used, it is intended to have that connotation. The radius of the blade 15 from its center to the outer end of each of the blade elements 17, 18 and 19 is equal and from each of these points on to the following blade element, the radius of the peripheral portions of the blade 15 is gradually reduced so as to provide a cut-back along a line approaching a spiral of Archimedes. At each of the elements 17, 18 and 19, the radius of the peripheral portions of the blade 15 is substantially increased, as can be clearly seen in Fig. 1, and is then gradually reduced again to a minimum immediately preceding the following blade element.

The radial length of each of the cutting elements 17, 18 and 19 is very small as compared to the radius of the disc and is preferably about 0.278 inch and, in any event, should be less than ½ of on inch to provide maximum safety. In this manner the cutting edges of the blades 17, 18 and 19 are only sufficiently exposed to permit the blade to contact grass, as the blade is pushed or driven forward at some optimum speed. The exposed edge, considering rotational speed of the blade and forward speed of the unit, will be only a fraction of an inch.

The combination of these movements generates an advancing circle, a portion of which approaches a spiral of Archimedes, and can be defined by an equation $e = (R - b\theta)$ where $e$ and $\theta$ are the distance and angle respectively from the center of rotation of the disc to the point in question, "R" is the radius of the disc, and "b" is the distance along the line of linear motion from a fixed reference. Another description would be the locus of points of a point at the extremity of a rotating blade which is advancing in a straight line normal to its axis of rotation. Mathematically, the figure generated by this point is known as a curtate trochoid, the minor or rolling radius being that required to arrive at the forward speed of the mower, and the major or generating radius being equal to the radius to the tip of the cutting element. This can be likened to the Palmer method penmanship exercise of writing an advancing circle. This cutback along a line approaching a spiral of Archimedes permits a blade of grass which was barely missed by one cutting element to remain erect as the mower advances until the succeeding cutting blade can contact the blade of grass. As a result, any particle of mass encountered by this exposed cutting element will be struck at its edge only, resulting in a spinning motion about its centroid. It is true that this spinning may result in the object rolling away from the mower, but it will have little linear energy. This principle can probably be best pictured mentally by consideration of a "topped" golf ball that will spin very fast, but will have a quite harmless trajectory when compared to a ball hit "on center." The latter ball in its flight can cause fatal injuries, whereas the former will do little damage. By the criteria set forth above, a cutting blade comprising a series of spirals with only a fraction of an inch of exposed edge at various points on the periphery would accomplish the foregoing.

The energy of motion, or kinetic energy, constitutes the danger associated with a particle of mass in motion when this particle contacts an object. When you consider a stone, for example, the danger becomes the enregy within the stone which is accelerated by contact with the fast moving blade. The energy that this stone then possesses is dependent on its mass and its velocity and the danger lies in the effect produced on a body in its path. Mathematically, the equation for this energy becomes $F = \frac{1}{2}MV^2$. The velocity is noted to be a squared function; hence, at one-half the velocity, the energy becomes only one-fourth. The velocity which we consider is only that vector involved in generating a curvilinear path for the mass. Thereffore, to impart maximum velocity the stone must be contacted at its exact centroid or center of gravity. Any contacting remote from the centroid results in two motion vectors which we must consider. One vector tends to turn the object about its centroid; the other tends to displace the object in a straight line. The latter is the only one which concerns this case. The construction shown in Figs. 1–2 precludes the possibility of any one of the cutting blades 17, 18 and 19 ever hitting an object of dangerous mass at its centroid. Thus, the energy formula results in a very low value of the velocity component with which we are interested. An object such as a stone will be given a considerable spinning action but the amount of force with which the object is moved in a straight line will be quite low.

Fig. 3 shows a second embodiment of my invention. As shown, it includes a disc 20 which is formed of flat plate-like material and has a plurality of recesses or grooves 20a, 20b and 20c cut in the outer or peripheral portions P thereof. The plate 20 is mounted upon the vertical shaft 21 for rotation therewith in the direction of the arrow shown. The portions of the disc 20 immediately ahead of the recesses 20a, 20b and 20c are bent upwardly to provide upturned lips 22, 23 and 24 respectively. The portions immediately trailing each of the recesses 20a, 20b and 20c are shapened to provide blade elements 24, 25 and 26 respectively. Each of these blade elements 24, 25 and 26 are bent downwardly away from the general plane of the disc 20 at slightly an angle of approximately 6° and a distance of 0.278–0.50 inch. This can best be seen by reference to Fig. 4. It will be noted that each of the blades 24, 25 and 26 extends substantially radially. The length of each of these blades is preferably less than ½ of one inch and, in any event, it will be noted that no portion of the blades 24, 25 and 26 extend radially outwardly to any appreciable extent beyond the portions of the disc 20 which immediately precede it. In other words, the portions which define the lift elements 22, 23 and 24 extend radially outwardly substantially as far as do the blade elements 24, 25 and 26.

It is considered very desirable for some types of grass cutting that a pressure differential between the lower and upper air layers (below and above the blade) be established to cause a "suction" effect which will tend to lift the blades of grass (also weeds, leaves, etc.) into a more erect position for uniform and best cutting. This can be accomplished by providing a "lift section" of a blade with a resultant propeller or fan action causing a low pressure area in the vicinity of the rotating blade and causing an airflow from below to above the cutting plane. This requires an application of Bernoulli's theorem on airflows and pressures. This is accomplished on many conventional blades (usually consisting of a flat strip of metal) by twisted or bent up ends. Because of the low "activity factor" the conventional blade has very local effective lift areas and they usually immediately succeed or follow the cutting edge. By the term "activity factor" I refer to the relation of the amount of solid area of effective lift section to the exposed area of the swept disc. A conventional blade generates considerable turbulence, and undesirable vortices result that are not to advantage in maintaining desirable airflow and resultant lift characteristics.

Fig. 3, which shows the second embodiment of my invention, illustrates how I accomplish the object of safety and meet the requirements of lift. I have done this by providing the disc 20 with optimum openings, each opening being provided with a lift section preceding the cutting edge. For example, the lift section 22 precedes the cutting edge or blade 25 rather than trailing the cutting edge as has heretofore been commonly utilized. The lift acton whch is required is to be balanced against a minimum exposure of objects of dangerous mass that can and will get under the cutting blade. It is clear that a solid disc could not impart any linear energy of consequence to such a mass. By retaining a maximum area of solid disc, as shown in Fig. 3, I have greatly reduced the possible exposure, and demonstrated a structure which tends to keep any objects of mass below the blade. By means of mass differentiation or inertia separation, the blades of grass, leaves, etc., can be made to enter the cutout areas 20a, 20b and 20c of the disc 20 behind the lift section while objects of appreciable mass will not be pulled into a position where the cutting edges could strike more than an edge of such an object. Such contact could impart a spinning of the object about its centroid as previously hereinbefore described. It is believed that inertia separation is a more appropriate term for use in describing this action than mass differentiation, since the low values of inertia of blades of grass, leaves, etc., permits them to be carried along streamlines (path of a particle of air in motion relative to an adjacent object) while at the same time objects of greater mass will remain inert or follow paths of more linear nature.

Fig. 5 shows a third embodiment of my invention. This embodiment includes a disc 28 which is substantially circular in configuration and has a plurality of cutting teeth 29, 30 and 31 carried at its outer or peripheral portions R and extending outwardly and downwardly from the peripheral portions. The disc 28 is adapted to be mounted for rotation with a vertical shaft S and mounted upon the lower end thereof a short distance above the ground. The direction of rotation of the shaft S is indicated by the arrow in Fig. 5. As can best be seen by reference to Fig. 6, the teeth elements 29, 30 and 31 extend downwardly at less than a right angle and have rearwardly sloping cutting edges 29a, 30a and 31a, as best shown in Fig. 5. This embodiment, as shown in Figs. 5–7, is best designed for purposes of rough cutting such as high, coarse weeds, saplings, and such. It will be noted that these teeth are located at or near the point of largest diameter. No more of such teeth are required than there are normal cutting edges on such a vehicle. These teeth extend only a fraction of an inch downwardly and thus provide a minimum of exposure to objects of mass as previously described with respect to the structures shown in Figs. 1 and 3. The length of these teeth are preferably approximately 0.278 inch and in any event should be less than one-half of one inch. Since the teeth are of a minimum size, it is impossible for them to engage an object of appreciable mass sufficiently near its centroid to impart to the object a dangerous trajectory and speed.

Fig. 8 shows a fourth embodiment of my invention. As shown, it includes a disc 32 which is preferably formed of flat-type material and it is adapted to be mounted on the lower end of a vertically extending shaft 33 for rotation therewith at high speed a short distance above the level of the ground and is positioned to engage and cut the grass. This embodiment has the features disclosed in Fig. 3 and, in addition, provides means for recirculating the cut material in order to accomplish additional comminution thereof. The disc 32, as shown, has three relatively large recesses 32a, 32b and 32c. The outer or peripheral portions T of the disc 32 which immediately precede these openings 32a, 32b and 32c are bent upwardly to provide upturned lift elements 34, 35 and 36. Blade elements 37, 38 and 39 are formed on the peripheral portions of the disc which follow the openings 32a, 32b and 32c during the rotation of the disc. If the true periphery of the disc 32 as formed is followed it will be seen that the blade elements 37, 38 and 39 each extend outwardly of the peripheral portions 60, 61, and 62 which immediately precede them and define the bottoms of the recesses 32a, 32b and 32c respectively. These blade elements 37, 38 and 39 extend radially a distance equal to approximately ¼ the radius of the disc 32. It will be noted that the recesses 32a, 32b and 32c are equidistantly spaced and extends circumferentially of the disc along an arc of only about 30°.

Relatively smaller areas of the peripheral portions of the disc 32 are cut away at points between the recesses 32a, 32b and 32c. These recesses are indicated by the numerals 32d, 32e and 32f. It will be noted that these recesses 32d, 32e and 32f are spaced approximately equidistantly between the adjacent larger recesses formed in the peripheral portions which carry the blades 37, 38 and 39. The peripheral portions of the blade 32 which follow the recesses 32d, 32e and 32f are bent upwardly to form deflector elements 40, 41 and 42. These deflector elements engage the grass which has been cut by the immediately preceding blades and cause it to be carried downwardly below the disc 32 so that it may be later recirculated and drawn upwardly in the path of the following blade by the upturned lift which immediately precedes it. For example, the deflector element 42 will engage the grass which has been cut by the blade 39 and deflect it downwardly below the disc 32 so that the lift element 34 may again draw it upwardly into the path of the blade 37 for further comminution.

Fig. 11 shows a rotary mower indicated generally as R having a housing H and a motor M. A vertical shaft 43 carries a disc 44 constructed similarly to one of the discs shown in Figs. 1–10. It will be noted, however, that the shaft 43 is oriented so that it is slightly off vertical so that the forward rotating edge 44a of the disc 44 is disposed at a slightly lower elevation than the rear edge 44b. It has been found that this has an added advantage for there is no drag by the uncut grass against the underside of the disc 44 except at the forward portions 44a while the medial and rearward portions 44b of the blade will pass freely above and in non-engaging relation through the upstanding blades of grass which have been cut off by the forward portion 44a. In this manner, the drag which is normally exercised on the underside of a disc such as the disc 44, is substantially reduced and therefore less power is required to drive the disc.

Fig. 12 shows a fifth embodiment of my invention. The device consists of a disc 45 mounted upon the vertical rotating shaft 46 in a manner similar to the manner in which the discs hereinbefore described will be mounted. However, in this instance, the blade elements are formed on a separate bar 47 rather than being carried by the disc itself. The disc 45 is disposed beneath the bar 47 and only the end portions of the bar extend outwardly beyond the peripheral portions of the blade 45. The outer end portions of the bar 47 carry relatively short blade elements 48 and 49. The portions of the bar 47 which trail the blades 48 and 49, are bent upwardly to form upturned lips 50 and 51 which provide the desired lift. The blade elements 48 and 49 are relatively short and therefore any object of appreciable mass can be engaged thereby only at a point remote from the centroid of the object. The length of the blades 48 and 49 are preferably approximately 0.278 inch and should always be less than one-half of one inch to make sure that no object of appreciable mass can be engaged sufficiently close to its centroid so that the bar 47 will impart to that object a dangerous trajectory and speed.

One of the advantages of the embodiment shown in Fig. 12 over the rotary mower blades heretofore known is that the safety factor is greatly increased. Careful study of what takes place when a foreign object such as a piece of wire is engaged by a blade consisting of a structure such as the bar 47 alone, which is the design generally heretofore followed in the art, shows that the wire has two components to its eventual velocity, one of which may be eliminated by the design shown in Fig. 12. If the blade consists only of a bar such as the bar 47 and a piece of wire is engaged by the portions of the bar between the shaft 46 and the outer tip of the bar, a very substantial velocity will be imparted to the piece of wire from the centrifugal component which results from the wire being flung outwardly along the length of the bar. Thus a piece of wire which would be flung from the blade portion of such a bar would have added to its normal rotational velocity an additional velocity imparted to it by the centrifugal component. By securing the disc 45 to the underside of the bar 47, I have prevented such objects from being engaged by the bar 47 except at its extreme end portions and thus I have positively precluded the introduction of the centrifugal component into the resultant velocity.

It can be shown mathematically that the preferred length of the cutting element is about 0.278 inch. It is possible, of course, that a slightly longer cutting blade may be utilized but in any event the length of the cutting edge or the portion of the cutting blade which might engage a foreign object should be less than one-half of one inch to insure that no foreign object of appreciable mass can be engaged sufficiently close to its centroid so as to have imparted thereto a dangerous trajectory and speed by the rapidly rotating disc.

Thus it can be seen that I have provided a novel rotary blade which has substantially increased safety characteristics. With a blade constructed in accordance with the disclosure herein, it is impossible for any object of appreciable mass to be projected at a dangerous trajectory and speed by the rapidly rotating disc. The only appreciable motion which can be imparted to such an object by one of my rotary discs is a spinning movement rather than a dangerous trajectory along a relatively straight line.

In addition to the above, my safety blades have other advantages. One of these advantages is that the noise level, because of the controlled air flow and resultant reduction in sharp edge noise level of this blade, is appreciably reduced. The fly wheel or gyroscopic effect which is attained through the use of a disc is also of advantage to the engine structure and will provide smoother angular acceleration of all moving parts, in this manner improving or increasing the span of life and service of the engine and reducing vibration.

The fact that it is impossible for an object of appreciable mass to be firmly engaged by one of my rotary blades also is an advantage insofar as the effect on the machine which carries the blade is concerned. Because it is impossible to firmly engage such an object, there are no sudden impacts upon the blades as will occur when a blade of the conventional design is utilized.

In addition, through the use of a safety blade designed as disclosed herein, there is a substantial conservation in power requirements. The conventional "lift" or "suction" blades in effect beat the air within the housing so that there is considerable energy and power consumed in accomplishing this undesirable characteristic. Through the use of the disc members which constitute my safety blade, this "beating up" of the air is eliminated and thus energy is conserved and the noise level is reduced.

It will also be noted that a blade constructed in accordance with the disclosure herein will have appreciably more strength than a blade of the bar type for the centrifugal forces are quite thoroughly distributed in a manner which may be likened to a fly wheel which has very high bursting strength. The presence of only very infrequent shock loading reduces the intermittent and peak stresses which are imposed upon my safety blade.

Thus it can be seen that I have provided a number of safety blades of various design, each of which has substantially increased safety characteristics which eliminate many of the disadvantages heretofore known in rotary blades. If a rotary blade of the type herein disclosed is utilized, bystanders and operators need not be concerned about being injured by flying pieces of metal and the like which may be engaged by the rapidly rotating blades for it is impossible for a blade of this design to engage such an object sufficiently near its centroid to impart to it a dangerous trajectory and speed.

It will, of course, be understood that various changes may be made in the form, details, arrangement and proportions of the various parts without departure from the scope of my invention.

What is claimed is:

1. A rotary mower blade comprising a horizontally disposed flat generally circular disc adapted to rotate about its center and having a cutting portion confined to an area adjacent the periphery thereof and extending radially only a relatively short distance as compared to the diameter of said disc, said disc having an opening at its cutting portion bounded on one side by a downwardly projecting cutting edge and on its opposite side by an upwardly inclined disc portion, said opening defining a sector of said disc substantially less than 60°, said upwardly inclined disc portion forming a lift element immediately ahead of said cutting edge with respect to the direction of rotation of the disc to create an updraft immediately ahead of said cutting edge during rotation of the disc whereby only relatively light material such as grass will be lifted in the path of said cutting edge.

2. A rotary mower blade comprising a horizontally disposed flat generally circular disc adapted to rotate about its center and having a cutting portion confined to an area adjacent the periphery thereof and extending radially only a relatively short distance as compared to the diameter of said disc, said disc having an opening at its cutting portion bounded on one side by a downwardly projecting cutting edge and on its opposite side by an upwardly inclined disc portion, said opening defining a sector of said disc substantially less than 60°, said upwardly inclined disc portion forming a lift element immediately ahead of said cutting edge with respect to the direction of rotation of the disc to create an updraft immediately ahead of said cutting edge during rotation of the disc whereby only relatively light material such as grass will be lifted in the path of said cutting edge, the peripheral portion of said disc being provided with a recess spaced circumferentially from said opening, said recess having on one side thereof an upwardly extending deflector element, said deflector element being disposed behind its associated recess and ahead of said lift element with respect to the direction of rotation of the disc to engage grass which has been cut and cause it to be carried downwardly below the disc for recirculation.

3. The assembly as defined in and by claim 1 wherein said cutting element has its cutting edge extending downwardly less than one-half of an inch from the general horizontal plane of said disc.

4. A rotary mower blade comprising a horizontally disposed flat generally circular disc adapted to rotate about its center and having a cutting portion confined to an area adjacent the periphery thereof and extending radially only a relatively short distance as compared to the diameter of said disc, said disc having an opening at its cutting portion bounded on one side by a downwardly projecting cutting edge and on its opposite side by an upwardly inclined disc portion, said opening defining a sector of said disc substantially less than 60°, said upwardly inclined disc portion forming a lift element immediately ahead of said cutting edge with respect to the direction of rotation of the disc to create an updraft immediately ahead of said cutting edge during rotation of the disc whereby only relatively light material such as grass will be lifted in the path of said cutting edge, the peripheral portions of said disc to which said cutting portions thereof are confined extending radially outwardly only a short distance beyond the immediately preceding peripheral portions of the disc.

References Cited in the file of this patent

UNITED STATES PATENTS

| | | |
|---|---|---|
| 1,336,257 | Muzzy | Apr. 6, 1920 |
| 1,656,105 | Durkee | Jan. 10, 1928 |
| 1,954,579 | Smith | Apr. 10, 1934 |
| 2,071,872 | Cockburn | Feb. 23, 1937 |
| 2,185,659 | Chernow | Jan. 2, 1940 |
| 2,602,277 | Johnson | July 8, 1952 |
| 2,737,772 | Jacobsen | Mar. 13, 1956 |

FOREIGN PATENTS

| | | |
|---|---|---|
| 23,921 of 1899 | Great Britain | Sept. 15, 1900 |